Aug. 18, 1959 R. L. LICH 2,899,911
RAILWAY VEHICLE BODY AND TRUCK ASSEMBLY
Filed July 5, 1956 2 Sheets-Sheet 1

INVENTOR
RICHARD L. LICH
BY Rodney Bedell
ATTORNEY

Aug. 18, 1959  R. L. LICH  2,899,911
RAILWAY VEHICLE BODY AND TRUCK ASSEMBLY
Filed July 5, 1956  2 Sheets-Sheet 2
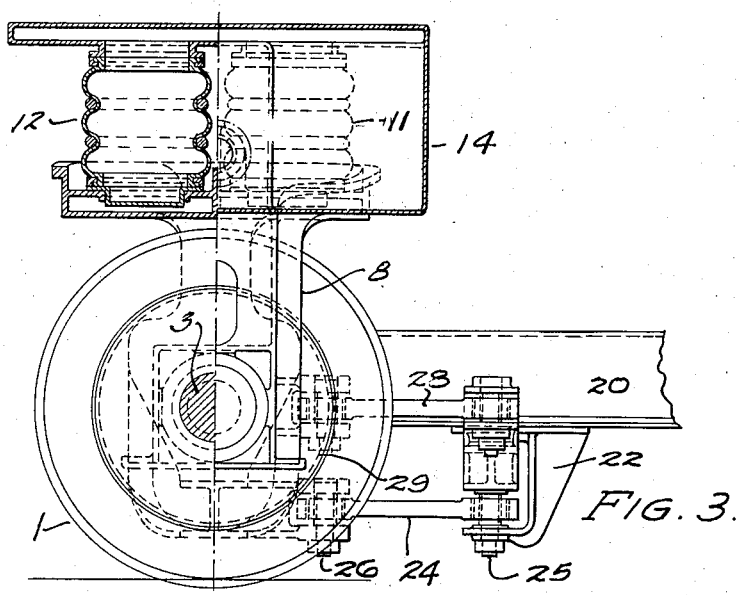
FIG. 3.
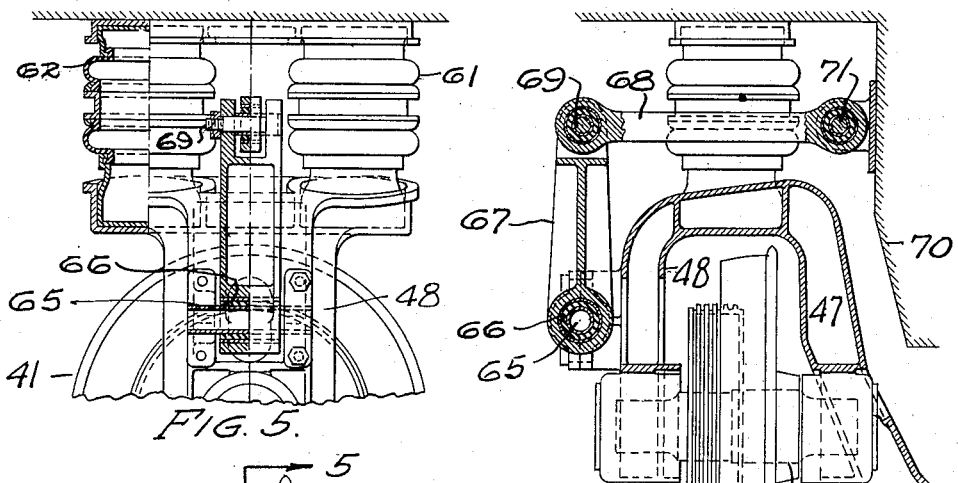
FIG. 5.
FIG. 6.
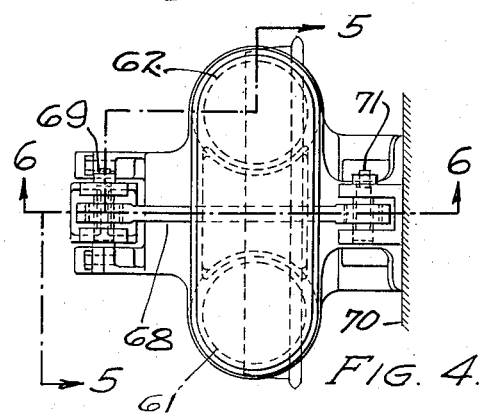
FIG. 4.
INVENTOR
RICHARD L. LICH
BY Rodney Bedell
ATTORNEY United States Patent Office 2,899,911
Patented Aug. 18, 1959

2,899,911

RAILWAY VEHICLE BODY AND TRUCK ASSEMBLY

Richard L. Lich, Ferguson, Mo., assignor to General Steel Castings Corporation, Granite City, Ill., a corporation of Delaware Application July 5, 1956, Serial No. 596,032

12 Claims. (Cl. 105—171)

The invention relates to railway rolling stock and is characterized by the mounting of a railway vehicle body upon a two wheel truck having a transverse frame member extending over the truck wheels and directly mounting body-supporting springs.

One object of the invention is to simplify and lighten body supporting structure in a truck of the type described. Another object is to arrange for adequate relatively lateral movement between the truck and body while controlling the same. Another object is to simplify the torque reaction connections between body and truck but maintaining the truck frame upright. Another object is to provide a simple structure providing for the necessary angling between a vehicle body and a two wheel truck on curved track. These and other more detailed objects are attained by the structure shown in the accompanying drawings in which:

Figure 3 is a vertical longitudinal section on line 3—3 of Figure 1.

Figure 4 is a top view of one end of a truck embodying a different lateral motion resistance structure.

Figure 5 is a vertical longitudinal section and elevation on line 5—5 of Figure 4.

Figure 6 is a vertical transverse section on line 6—6 of Figure 4.

Figures 1, 2:
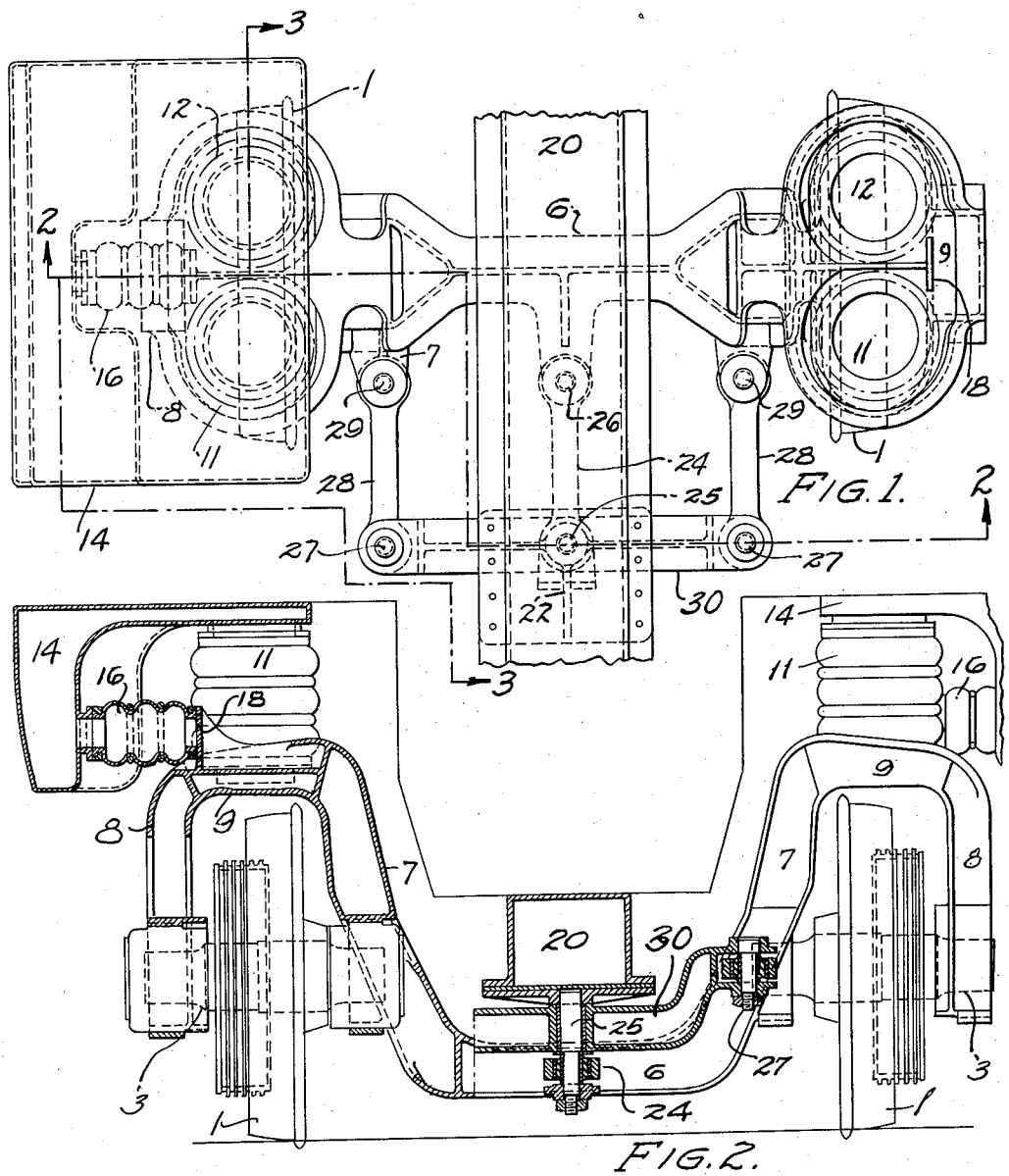
Figure 1 is a top view of a two wheel truck with portions of the associated vehicle body also shown.
Figure 2 is a vertical transverse section and end view on line 2—2 of Figure 1.

The truck shown in Figures 1, 2 and 3 includes two wheels 1, each mounted upon an individual stub axle 3, the ends of which are journaled in a truck frame comprising a low level middle portion 6, an inverted U-shaped continuation at each end thereof, each continuation comprising an inner upright portion 7, an outer upright portion 8 and a cross piece 9. The ends of axles 3 are journaled in upright portions 7 and 8. Cross bar 9 is widened lengthwise of the vehicle and forms an extended seat for upright bellows-type air springs 11, 12 positioned at opposite sides of the transverse center line of the truck. These springs directly support the vehicle body near the sides thereof. The vehicle body structure directly over springs 11, 12 is recessed upwardly to receive the springs and a hollow member 14 which forms an air reservoir or surge chamber open to the springs and to a bellows-type smaller spring 16 having its axis disposed horizontally and having its ends seated against a depending portion of reservoir 14 and against an upright web 18 on truck frame cross bar 9. The central portion of the car body extends downwardly between truck frame uprights 7 and includes an inverted U-shaped center sill or backbone 20.

A bracket 22 (Figure 3) depends from center sill 20 at a point spaced longitudinally from the truck. A central link 24 has a pivot pin connection 25 to bracket 22 and a pivot pin connection 26 to truck frame middle portion 6. A pair of side links 28 at a higher level than link 24 have pivot pin connections 29 to frame uprights 7 and extend lengthwise of the vehicle parallel to link 24, the remote ends of links 28 having pivot pin connections 27 to a cross bar 30 which is depressed intermediate its ends to closely overlie link 24. Pivot pin 25 extends through cross arm 30, link 24 and center sill bracket 22 and is rotatable in each of these elements. All of the connections between links 24, 28 and associated parts are rubber bushed. The positioning of links 24, 28 at different levels resists torque reactions between the body and truck tending to overturn the truck lengthwise of the vehicle.

With this structure the truck frame and vehicle body may move relative to each other transversely of the truck, by the inclination of links 24, 28, subject to the yielding resistance of horizontally disposed springs 16, and thereby accommodate track irregularities so as to reduce or eliminate lateral shocks. The truck and body may swivel relative to each other horizontally by the swinging of cross arm 30 on pin 25.

The form of the invention illustrated in Figures 4, 5 and 6 embodies wheels 41, stub axles 43, a truck frame 46, 47, 48, body-supporting springs 61, 62 similar to the corresponding parts previously described, and it is to be understood that the pivotal connection between the frame and body is as previously described, but the lateral motion between the truck and body is controlled by a torsion spring device comprising a tubular member 65 secured to frame uprights 48, a rubber bushing 66 surrounding and bonded to tube 65, an upright arm 67 with its lower end surrounding and bonded to bushing 66, a transverse link 68 having one end secured to the upper end of arm 67 secured by a pivot pin 69 and having its other end secured to the body center sill 70 by a pivot pin 71.

The rubber bushings surrounding elements 65, 69 and 71 accommodate the necessary horizontally swiveling of the truck relative to the body.

In both forms of the invention the parts of the truck and the connections to the body are few in number but effective for their intended purpose and readily accommodate the necessary movements of each truck frame, and associated axles, to the vehicle body. Hence the trucks are arranged for individual "steering" as distinguished from truck and body assemblies in which the trucks remain in fixed alignment with the body.

What is claimed is:

1. A railway vehicle two wheel truck comprising a frame rigid from side to side of the truck, a stub axle at each side of the truck individually mounted in the frame and mounting an individual wheel, a vehicle body-supporting spring seated directly on the truck frame above each wheel, links at opposite sides of the longitudinal center line of the truck extending from the frame parallel to each other longitudinally of the truck, and a cross bar pivotally connected at its ends to said links at their outer ends and provided with structure between its ends for pivotal connection to a vehicle body.

2. A railway vehicle truck according to claim 1 which includes an air spring, with its axis disposed transversely of the truck and at the level of the body-supporting spring, with one end seated against the truck frame and with its other end positioned to oppose a vehicle body.

3. A railway vehicle comprising a truck according to claim 1, and a body structure in which a portion of the body is of hollow construction and forms an air reservoir, there being an open connection between the air reservoir and the air spring.

4. A railway vehicle comprising a truck according to claim 1 and a body structure, there being means for positioning the car body relative to the truck frame, transversely of the vehicle, comprising an air spring with its longitudinal axis disposed transversely of the vehicle, the body including a hollow chamber at the sides of the truck provided with open connections to the adjacent air springs.

5. A railway vehicle truck according to claim 1 which includes a torsion spring at the side of the truck and comprising an elongated body secured to the truck frame with its axis disposed lengthwise of the truck, there being a radial arm projecting upwardly from said body to a point above the level of the truck wheel and yieldingly maintained in an upright position, a link extending transversely of the truck from the upper end of said arm and over the adjacent wheel and provided with a pivot element for connection to a vehicle body part positioned inboard of the truck wheel.

6. A railway vehicle truck according to claim 1 which includes a device at each side of the truck comprising two parts movable relative to each other, one of said parts having a connection to the truck frame and the other of said parts having elements for attachment to a vehicle body mounted on the truck, there being means between said parts yieldingly resisting their relative movement out of a predetermined position whereby said connection and elements yieldingly maintain the truck and a vehicle body mounted thereon in centered relation to each other.

7. A railway vehicle truck comprising a transverse frame structure having a low level middle portion with an inverted U-shaped continuation at each end thereof, each continuation comprising uprights spaced apart and a cross piece at their upper ends, a wheel positioned between the uprights of each continuation and provided with a stub axle the ends of which are mounted in the uprights, springs seated on the cross pieces of said continuations and arranged to support a vehicle body, and a link pivotally connected to each continuation at the level of the axle and extending therefrom lengthwise of the truck, a cross bar having its ends pivotally connected to the remote ends of said links, and a link extending lengthwise of the truck at the level of said frame middle portion and pivotally connected at one end to the middle portion of said frame middle portion and provided with means at its remote end for pivotal connection to the vehicle body.

8. A railway vehicle truck having a rigid frame, a link pivoted at one end to the frame near each side of the truck and extending lengthwise of the truck, a cross bar pivotally connected at its ends to the latter-mentioned ends of said links, and a link positioned intermediate and paralleling said first mentioned links and pivotally connected at one end to said frame intermediate the ends of the latter and a device for pivotally connecting the other end of said intermediate link to the middle of said cross bar and to a vehicle body.

9. The combination with a railway vehicle body and a two wheel truck supporting the same, in which the truck frame supports the body solely at the sides of the truck, wheel and axle structure, a truck frame carried thereby, a link extending from the wheel axis lengthwise of the body at each side of the truck and each having an upright-axis pivot connection at one end to the truck frame, a cross bar pivotally connected at its end to the other ends of said links and pivotally connected intermediate its ends to the vehicle body, a link extending lengthwise of the body intermediate said first mentioned links and having upright-axis pivot connections at its opposite ends to the truck frame and to the vehicle body respectively, said links holding the truck and body against relative movement longitudinally of the body but accommodating their relative movements laterally and angularly.

10. A railway vehicle body and truck assembly as described in claim 9 which includes a torsion spring comprising an elongated central member secured to the truck frame, with its axis extending lengthwise of the assembly, a sleeve of rubber-like material surrounding said central member and secured thereto, an outer member surrounding said sleeve and secured to its outer face, an arm secured at one end to said outer member and extending radially therefrom, and a link extending transversely of the assembly and secured at one end to the outer end of said arm and at its other end to the vehicle body.

11. A railway vehicle truck comprising axles, wheels, a frame carried thereby and a body-supporting spring structure mounted on the frame and accommodating movement of a body supported thereby transversely of the truck, characterized by a torsion spring device having an elongated member extending lengthwise of the truck and secured to the side of the truck frame, at the level of the truck wheel, and provided with a rubber bushing, an arm secured at its lower end to said bushing and normally extending upwardly therefrom, and a link connected at one end to the upper end of said arm and extending therefrom inboard of the adjacent wheel and having an element at its other end for connection to a body mounted on the truck.

12. A railway vehicle two wheel truck comprising a frame rigid from side to side of the truck, a stub axle at each side of the truck individually mounted in the frame and mounting an individual wheel, a vehicle body-supporting spring seated directly on the truck frame above each wheel, links at opposite sides of the truck extending from the frame parallel to each other longitudinally of the truck, and a cross bar pivotally connected at its ends to the outer ends of said links and provided with structure between its ends for pivotal connection to a vehicle body, and means for connecting the truck frame to a vehicle body for positioning the body laterally of the truck.

References Cited in the file of this patent

UNITED STATES PATENTS

| | | |
|---|---|---|
| 2,011,918 | Stedefeld et al. | Aug. 20, 1935 |
| 2,252,789 | Van Dorn | Aug. 19, 1941 |